United States Patent [19]
DeMott

[11] Patent Number: 5,050,786
[45] Date of Patent: Sep. 24, 1991

[54] WAIST-ATTACHED CABLE HOLDER

[76] Inventor: Garth D. DeMott, N. 4876 Messer Rd., Merrimac, Wis. 53561

[21] Appl. No.: 498,422

[22] Filed: Mar. 26, 1990

[51] Int. Cl.⁵ .............................................. A45F 5/00
[52] U.S. Cl. .................................... 224/253; 224/103; 224/247; 224/245; 224/901; 24/134 R
[58] Field of Search ............ 224/247, 248, 253, 252, 224/901, 268, 269, 245, 103; 24/134 R, 132 R

[56] References Cited

U.S. PATENT DOCUMENTS

| | | | |
|---|---|---|---|
| 1,127,832 | 2/1915 | Voigt | 224/251 |
| 2,470,941 | 5/1949 | Orton | 224/103 |
| 2,714,979 | 8/1955 | McCarthy | 224/247 |
| 3,052,002 | 9/1962 | Lesher | 224/103 |
| 3,212,688 | 10/1965 | Lane | 224/247 |
| 3,364,529 | 1/1968 | Blacher | 24/134 R |
| 3,949,916 | 4/1976 | Yount | 224/253 |
| 3,979,797 | 9/1976 | Stember | 24/134 R |
| 4,253,218 | 3/1981 | Gibbs | 24/134 R |
| 4,308,643 | 1/1982 | Montplaisir | 224/103 |
| 4,762,257 | 8/1988 | Spillers et al. | |
| 4,828,154 | 5/1989 | Clifton | |

*Primary Examiner*—Linda J. Sholl

[57] ABSTRACT

A device attachable to a person's belt to partially support the weight of a flexible cable (or cables) extending between a welding machine and a welding tool (torch or electrode holder) held in the persons's hand. Most of the cable weight is transferred from the person's hand to his belt, thereby enabling him to more efficiently perform the welding operation, with greater assurance of good welds, and with lesser physical strain on the person's hand and arm.

2 Claims, 1 Drawing Sheet

U.S. Patent  Sep. 24, 1991  5,050,786
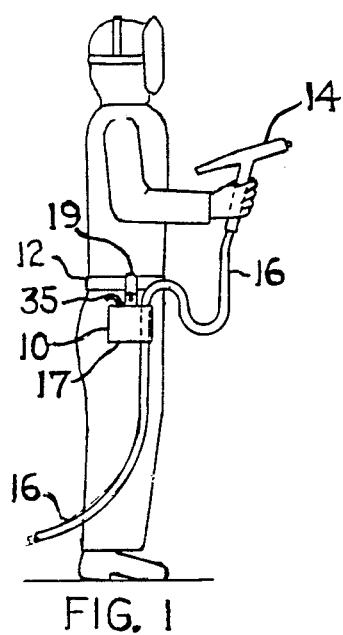
FIG. 1
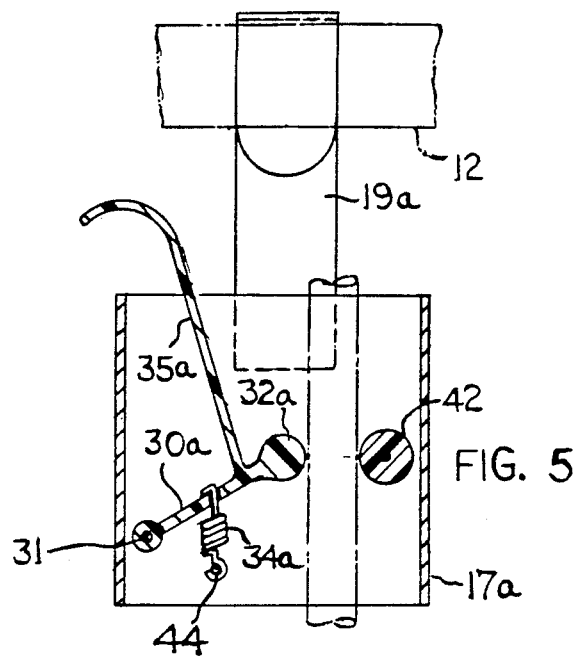
FIG. 5
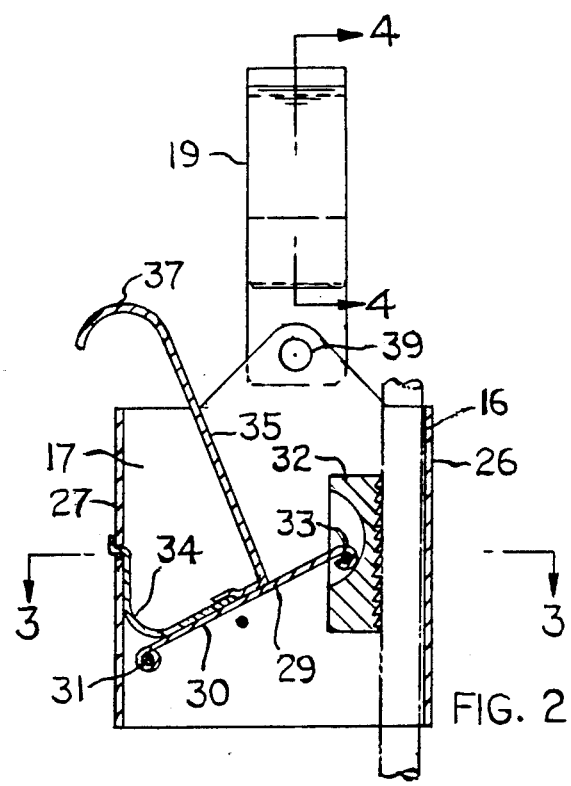
FIG. 2
FIG. 3
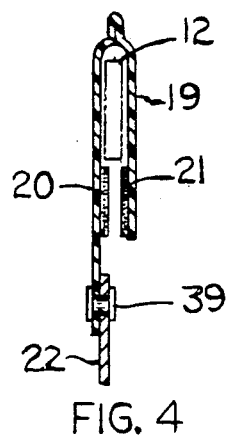
FIG. 4

WAIST-ATTACHED CABLE HOLDER

BACKGROUND AND SUMMARY OF THE INVENTION

This invention relates to a device attachable to a person's belt for supporting the weight of a flexible cable while the person is operating a tool extending from the cable. The invention is particularly useful in the field of welding.

Conventional welding apparatus comprises one or more cables (hoses) extending from a power source to a hand-held torch or electrode holder. In the case of oxyacetylene welding there are two such cables, one of which carries acetylene gas, and the other of which carries oxygen. In the case of heliarc welding apparatus there may be as many as four cables carrying an inert shield gas (argon), electric power, water coolant to the torch, and water coolant from the torch.

The various cables (hoses) are fairly heavy and can represent a significant physical burden for the person performing the welding operation. He can become fatigued over a period of time, which leads to poor quality welds and worker dissatisfaction.

The present invention relates to a device which can be attached to a person's belt, to at least partially support the weight or load of one or more cables extending from a power supply (welding machine or gas cylinder) to a welding tool (torch or electrode holder). The load on the person's hand is then only the weight of the welding tool and the short length of cable between the tool and the person's belt; the major portion of the cable weight and frictional drag is borne by the person's waist. A person's anatomy is such that significant loads can be carried by a person's waist without leading to fatigue or discomfort.

A major aim of the invention is to provide a device that will effectively transfer a major portion of a welding cable load from the person's arm-hand areas to his waist area, thereby lessening the fatigue factor and reducing worker dissatisfaction.

THE DRAWINGS

FIG. 1 is a side elevational view of a device of the present invention attached to the waist area of a person holding a welding torch.

FIG. 2 is an enlarged sectional view of the FIG. 1 device.

FIG. 3 is a sectional view on line 3—3 in FIG. 2.

FIG. 4 is a fragmentary sectional view on line 4—4 in FIG. 2.

FIG. 5 is a sectional view taken in the same direction as FIG. 2, but showing another form that the invention can take.

DESCRIPTION OF A PREFERRED EMBODIMENT OF THE INVENTION

FIG. 1 shows a cable-support device 10 attached to the belt 12 of a person equipped to perform a welding operation. He is shown carrying a welding torch 14 that extends from a cable (or cables) 16. The cable extends through a cable-support device 10, such that only the portion of the cable between device 10 and torch 14 imposes a load on the person's hand. The portion of the cable extending between support device 10 and the power source, not shown, imposes a load on the person's belt, rather than on the person's hand. Support device 10 has a retractable clamp means therein that grips the cable(s), thereby substantially reducing the cable loading on the person's hand.

FIGS. 2 and 3 show some features of the cable-support device. The device comprises a hollow upright rectangular tube 17 attached to the lower end portion of a belt-attachment loop means 19. As seen in FIG. 4, loop means 19 comprises a flexible U-shaped strap adapted to slip over (around) the person's belt 12, such that portions of the strap are located below the belt lower edge. Facing wall portions of the strap have adherent pads 20 and 21 secured thereon. These pads are formed of fibrous materials commercially available under the trade name VELCRO. The fibers in one of the pads have miniature loop configurations. The fibers in the other pad have miniature hook configurations. When the pads are pressed together the miniature hooks and loops interlock to hold the pads together, thereby preventing the U-shaped strap from upward displacement off of the person's belt.

Hollow tube 17 is a rigid structure having a rectangular cross section (FIG. 3), defined by relatively long side walls 22 and 24, and relatively short end walls 26 and 27. A slot 25 extends along side wall 24 parallel to the tube axis. The slot is wider than the diameter of cable(s) 16; accordingly each cable can be inserted into tube 17 by a transverse motion of the cable(s) through the slot. FIG. 3 shows three cables 16 located within tube 14 between tube end wall 26 and a cable clamp means 29.

Clamp means 29 comprises an elongated support arm 30 having one end thereof swingably attached to a transverse rod 31 extending between tube side walls 22 and 24 at a point near tube end wall 27. The other end of arm 30 is swingably connected to a cable-engagement element 32, via a transverse pin 33. Arm 30 is normally biased by a leaf spring 34 to swing downward in a clockwise arc around rod 31. Element 32 holds the cable(s) against tube end wall 26 with sufficient force to wedge the cables into fixed positions. Cable weight is applied through tube 17 and loop means 19 onto the person's belt 12, thereby removing a major portion of the cable load from the person's hand. The person performing the welding operation can freely move welding tool (torch) 14, as necessary, without loosening or affecting the wedge clamp action of element 32 on the cable(s).

In order to insert cables 16 into tube 17, or remove cables 16 from tube 17, it is necessary that cable clamp means 29 be retracted away from the cable. For this purpose there is provided a manual lifter means 35 affixed to arm 30. The upper exposed end portion 37 of the lifter means is turned or curled so that the person can exert a lift force with a single finger extending around (under) the curled end portion 37. When clamp element 32 is retracted away from cable(s) 16 (by a lift action on lifter means 35) the cables can be released from tube 17 by a transverse movement of the cable through slot 25.

Tube 17 is connected to the lower end portion of loop means 19 by a rivet structure 39. As shown in FIG. 4, the rivet extends through one leg of strap (loop) 19 and an extension of tube side wall 22. The rivet acts as a pivotable connection between tube 17 and the loop means 19, such that tube 17 will tend to remain in an upright position when the person bends over or otherwise changes the orientation of belt 12. This arrangement tends to keep a given condition of slack in the portion of cable 16 between support device 10 and torch 14, such that tool (torch) 14 can continue to be freely manipulated without adverse restraining effect by cable 16.

The drawings show tube 17 extending exactly vertically. In practice there may be some tilting of the tube, due to the fact that pivot 39 is slightly behind (to the left of) cable 16. The actual orientation of the tube may be affected by the direction taken by the cable, i.e. the direction of pull exerted by the cable laying on the floor surface between the welder power supply and the person doing the welding.

FIGS. 2 though 4 illustrate a presently preferred form of the invention. FIG. 5 shows another form that the invention can take. In this case the belt-attachment loop means consists of a U-shaped clip element 19a formed of spring metal so that the opposed walls of the clip element exert a clamp action on the person's belt. Clip element 19a is rigidly attached to an upright hollow tube 17a that is constructionally similar to tube 17 (FIG. 2).

The cable clamp mechanism of FIG. 5 comprises a fixed axis roller 42 mounted on a transverse rod extending between the tube side walls. A cooperating jaw (clamp element) 32a is formed as an integral extension of a support arm 30a that is swingably mounted on a transverse rod 31. Lifter means 35a is formed integrally with arm 30a. A tension spring 24a is trained between arm 30a and a rod 44 that extends between the tube side walls. Operationally the FIG. 5 device performs in essentially the same fashion as the device of FIGS. 2 through 4.

The FIG. 5 device does not have a pivotal connection with loop means 19a. However, the FIG. 5 clamp mechanism has limited area contact with cable 16 such that there is minimal chance that the clamp mechanism will adversely affect the direction or extent of slack of the cable section attached to tool 14.

The cable support devices of FIGS. 1 through 5 are envisioned to be primarily useful for supporting cables (hoses) used to supply electrical energy or combustible gases to welding electrode holders or welding torches. However, it is believed that the invention might be useful in other situations; e.g. by persons operating power tools (drills, saws, etc.) while standing on ladders, or by persons using hoses to spray clean automobiles.

I claim:

1. A device attachable to a person's belt for partially supporting the weight of a plural number of welding tool cables while the person is operating a welding tool attached to the cables; said device comprising a belt-attachment loop means having a lower end portion thereof locatable below the person's belt; an upright rigid hollow tube pivotably suspended from the lower end portion of said loop means, said tube having an axis that is essentially vertical when the device is attached to a person's belt; said tube having two parallel vertical side walls and two parallel connecting vertical end walls; one side wall of the hollow tube having an access slot (25) extending therealong parallel to the tube axis for insertion of a plural number of cables into the tube; and a manually-retractable clamp means located within said tube for clamping the inserted cables in fixed positions within the tube; said clamp means comprising an elongated support arm having one end thereof swingably attached to the tube for motion around a horizontal axis extending normal to the plane of said access slot, and a cable-engagement element attached to the other end of said support arm; said clamp means further comprising a lifter means (35) extending upwardly from said support arm, said lifter means having an exposed manual grip portion located above the tube.

2. The device of claim 1, wherein said hollow tube has a rectangular cross section.

* * * * *